Figure 1:
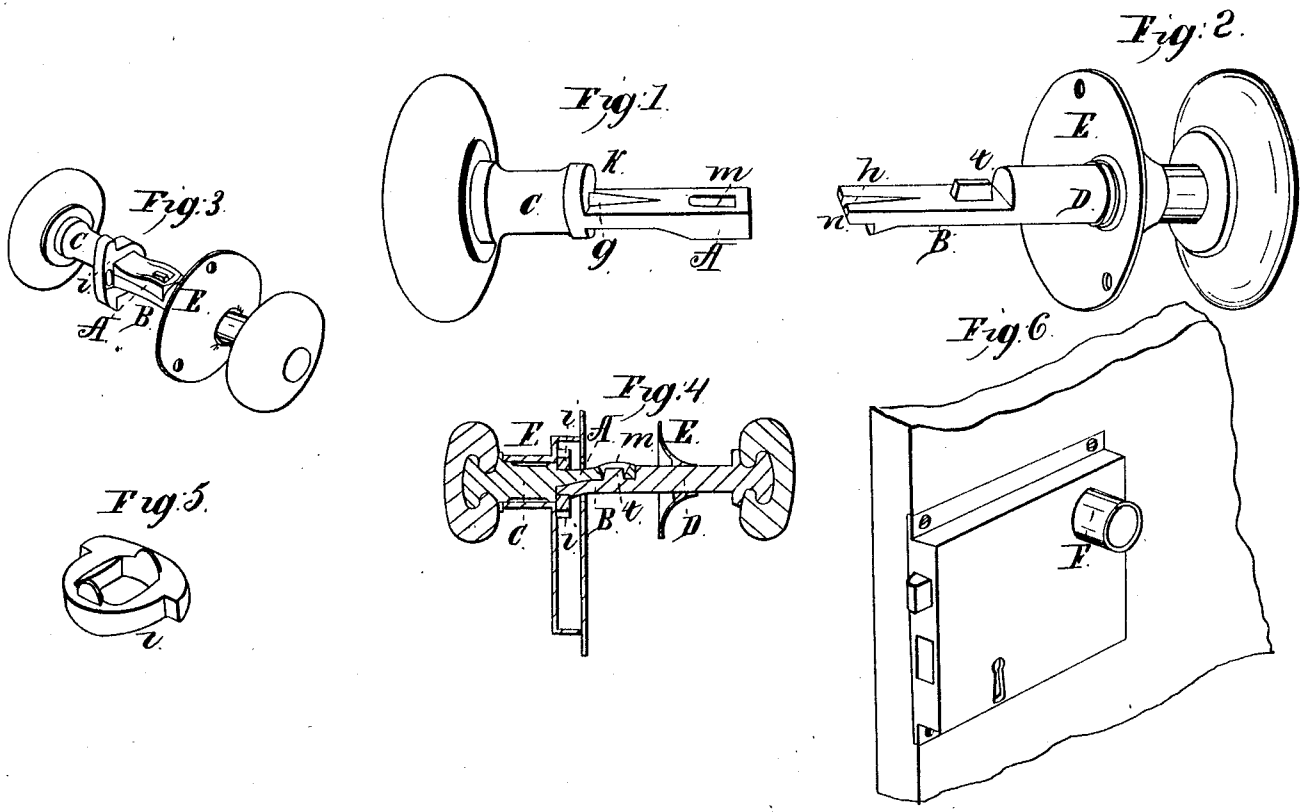
Figure 2:
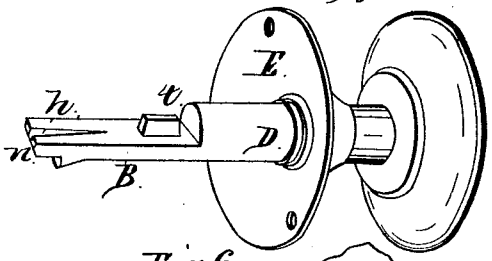
Figure 6:
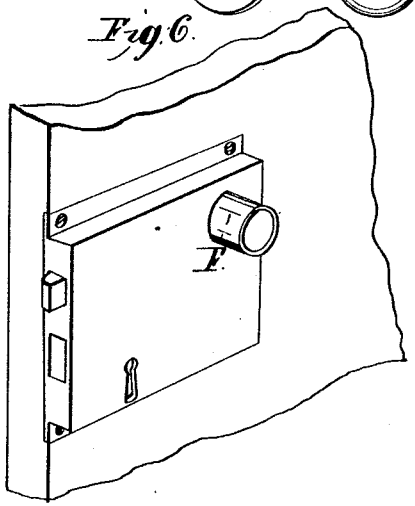
Figure 1:
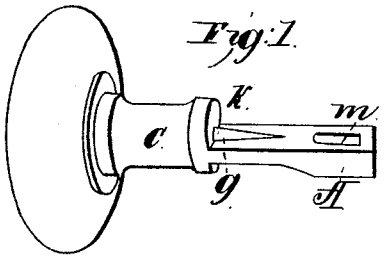
Figure 4:
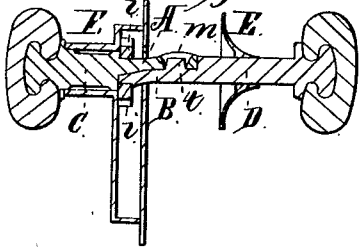
Figure 3:
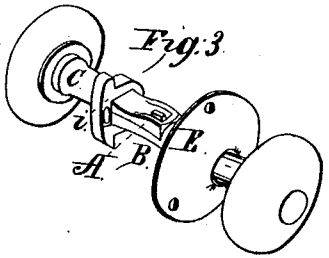
Figure 5:
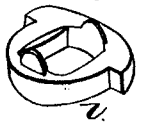

CLOSURE FASTENERS

DRAFTSMAN

358

Livingston, Roggen & Adams,

Knob Attachment,

No. 84, A.I. Patented Dec. 11, 1847.

AM. PHOTO-LITHO. CO. N.Y. (OSBORNE'S PROCESS)

358

Livingston, Raggen & Adams,

Clamp Gong Knob Attachment,

No. 84, A.I. Patented Dec. 11, 1847.

Original Pat. No. 20 July 7, 1846

AM. PHOTO-LITHO. CO. N.Y. (OSBORNE'S PROCESS)